United States Patent [19]

Patsiokas et al.

[11] Patent Number: 5,203,012
[45] Date of Patent: Apr. 13, 1993

[54] METHOD AND APPARATUS FOR OPTIMUM CHANNEL ASSIGNMENT

[75] Inventors: Stelios J. Patsiokas, Plantation; Paul D. Marko, Ft. Lauderdale; Craig P. Wadin, Sunrise; Edward S. Kovach, Plantation; Kenneth D. Alton, Coral Springs, all of Fla.

[73] Assignee: Motorola, Inc., Schaumburg, Ill.

[21] Appl. No.: 833,281

[22] Filed: Feb. 10, 1992

[51] Int. Cl.⁵ .............................................. H04Q 7/04
[52] U.S. Cl. .................................. 455/34.1; 455/34.1; 455/62; 379/60
[58] Field of Search ................... 455/33.1, 33.2, 34.1, 455/34.2, 54.1, 56.1, 62, 63, 67.1; 379/61, 60

[56] References Cited

U.S. PATENT DOCUMENTS 4,794,635  12/1988  Hess ....................................... 379/60

OTHER PUBLICATIONS

Common Air Interface Spec...; Version 1.1; Jun. 1991 European Telecommunications Standards Institute.
"Common Air Interface Specification to be used for the Interworking Between Cordless Telephone Apparatus in the Frequency Band 864.1 MHz to 868.1 MHz, including Public Access Services", Version 1.1, dated Jun. 30, 1991, published by the European Telecommunications Standards Institute.

Primary Examiner—Reinhard J. Eisenzopf
Assistant Examiner—P. Sobutka
Attorney, Agent, or Firm—Pedro P. Hernandez

[57] ABSTRACT

A method and apparatus for choosing the most optimum communication channel in a system (100) having a plurality of communication channels provides for reduced interference and increased system capacity. By establishing a set of threshold levels and comparing these threshold levels to receive signal strength level measurements for each of the communication channels, a communication device originating a call can be guaranteed of establishing communication using the communication channel with the least chance of being affected by interference or of affecting other channels already in use.

8 Claims, 7 Drawing Sheets

| STEP | CHANNEL NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 | CO CHANNEL | X | | | | | | | | | | | | | | | | | | | | | | | | | | | | | | | | | | | | | | | |
| 2 | ADJ CHAN OF CHAN ABOUT HIGH THRES. | | X | | | | | X | X | | | | | | | | | | | | | | | | | | | | | | | | | | | | | | | | |
| 3 | CHANNEL NUMBER/ADJ CHAN ABOUT MUTE THRES. | X | | | | X | X | | | | | | | | | | | | | | X | | | | | X | | | | | | | | | | X | | | | | |
| 4 | ALT CHAN OF ABOUT HIGH THRES. | | | X | | | X | | | X | | | | | | | X | | | | | | | | | | | | | X | | | | | | | | X | | | |
| 5 | INTERMOD OF CHAN ABOUT HIGH THRES. | | | | X | | | | | | X | | | X | | | | | | | | | | | | | | | | | | | X | | | | | | | | |
| 6 | ADJ CHANNEL IM | | | | | | | | | | | X | X | | X | X | | | | | | X | | | X | | | | X | | | X | | | | | X | | | | |
| 7 | ALTERNATE MUTE | | | | | | | | | | | | | | | | X | X | X | X | | | X | | | | | X | | X | | | | | | | | | | | |
| 8 | 3RD | | | | | | | | | | | | | | | | | | | X | | | | | | | | | | | X | | | | | | | | | | |
| 9 | 4TH | | | | | | | | | | | | X | | | | | | | | | | | | | | | | | | | | | | | | | | | | |
| 10 | REMAINING CHANNELS AFTER STEP 1 | 1 | | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|  | REMAINING CHANNELS AFTER STEP 2 | 1 | | 3 | 4 | 5 | 6 | | | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|  | REMAINING CHANNELS AFTER STEP 3 | | | | 4 | 5 | 6 | | | | 10 | 11 | 12 | 13 | 14 | 15 | 16 | 17 | 18 | | | | 22 | 23 | 24 | | 26 | 27 | 28 | 29 | 30 | 31 | 32 | 33 | | 35 | 36 | 37 | 38 | 39 | 40 |
|  | REMAINING CHANNELS AFTER STEP 4 | | | | 4 | 5 | | | | | | 11 | 12 | 13 | 14 | 15 | | 17 | 18 | | | | 22 | 23 | 24 | | 26 | 27 | 28 | | 30 | 31 | | 33 | | 35 | 36 | | 38 | 39 | 40 |
|  | REMAINING CHANNELS AFTER STEP 5 | | | | 4 | | | | | | | 11 | 12 | 13 | 14 | 15 | 16 | 17 | 18 | | | | 22 | 23 | 24 | | 26 | 27 | 28 | 29 | 30 | 31 | | 33 | | 35 | 36 | 37 | 38 | 39 | 40 |
|  | REMAINING CHANNELS AFTER STEP 6 | | | | | | | | | | | | | 13 | | 15 | 16 | 17 | 18 | | | | | 23 | | 25 | 26 | 27 | | 29 | 30 | 31 | | 33 | | 35 | | 37 | 38 | 39 | 40 |
|  | REMAINING CHANNELS AFTER STEP 7 | | | | | | | | | | | | 12 | 13 | | 15 | 16 | | | | | | | 23 | | | 26 | 27 | | 29 | 30 | 31 | | 33 | | 35 | | | 38 | 39 | 40 |
|  | REMAINING CHANNELS AFTER STEP 8 | | | | | | | | | | | | 12 | | | | 16 | | | | | | | | 24 | | | | | | 29 | 30 | | | | | | | | 39 | 40 |
|  | REMAINING CHANNELS AFTER STEP 9 | | | | | | | | | | | | 12 | | | | 16 | | | | | | | | 24 | | | | | | | 30 | | | | | | | | 39 | 40 |
|  | REMAINING CHANNELS AFTER STEP 10 | | | | | | | | | | | | | | | | 16 | | | | | | | | | | | | | | | | | | | | | | | | 40 |

400

METHOD AND APPARATUS FOR OPTIMUM CHANNEL ASSIGNMENT

TECHNICAL FIELD

This invention relates generally to communication systems, and more specifically to a method and system for optimum channel assignment.

BACKGROUND

A portable telephone system, such as a second-generation digital cordless telephone (CT-2) system, includes telepoint sites each having multiple transceivers. These transceivers allow persons using portable telephones (cordless telephone handsets) to access the public switched telephone network (PSTN) when in range of a telepoint. Each of the individual telepoint transceivers provide a particular channel of operation (at a different frequency) which can be used by a handset in order to communicate through the CT-2 system to the PSTN.

CT-2 systems typically operate between 864.150 MHz and 868.050 MHz, and can provide up to a theoretical maximum of 40 communication channels per telepoint (base-site), with each telepoint channel having 100 MHz channel spacing. The center frequency for the 40 channels can be calculated as: 864.050 MHz + (0.100 × n) MHz, where "n" is the channel number lying in the range of 1 to 40. In practice, since adjacent channels are not used due to selectivity constraints, a maximum of 20 channels is usually the practical limit. Most telepoint's usually have no more than 12–14 channels due to in-band interference and intermodulation problems in high density areas (e.g., a high-rise building or downtown area having more telepoints close to each other). As the number of channels in a telepoint increases, approaching the 20 channel practical maximum, the chances of not providing a good quality communication channel (communication link) increases tremendously due to greater chance for interference caused by adjacent channels, intermodulation, etc.

Presently, communication channels in a CT-2 system are assigned by determining which channels are available and assigning one of the available channels. The present, CT-2 channel assignment technique unfortunately does not provide telepoint users the best available (optimum) channel in terms of providing the communication channel having the least likelihood of being affected by interference or affecting other channels with interference (e.g., by adjacent or intermodulation channels, etc.).

A need thus exists for a method of assigning communication channels in a multi-channel system which can provide for the optimum channel available at any given point in time from an interference standpoint. Such an assignment method would in turn provide for higher capacity levels (more channels available) for the system with the same or less chances of interference.

SUMMARY OF THE INVENTION

The present invention provides for selecting an optimum communication channel for use as the communication link in a communication system having multiple communication channels. The selection method includes determining the receive signal strength of each of the plurality of communication channels in the system. Determining if any of the plurality of communication channels have a receive signal strength level below a first threshold level. Finally, selecting the communication channel having the lowest receive signal strength level if it is determined that none of the plurality of communication channels have a signal strength level below the first threshold.

BRIEF DESCRIPTION OF THE DRAWINGS

FIG. 6 shows a drawing showing how the optimum communication channel in accordance with the invention is chosen.

DETAILED DESCRIPTION OF THE PREFERRED EMBODIMENT

Figure 1:
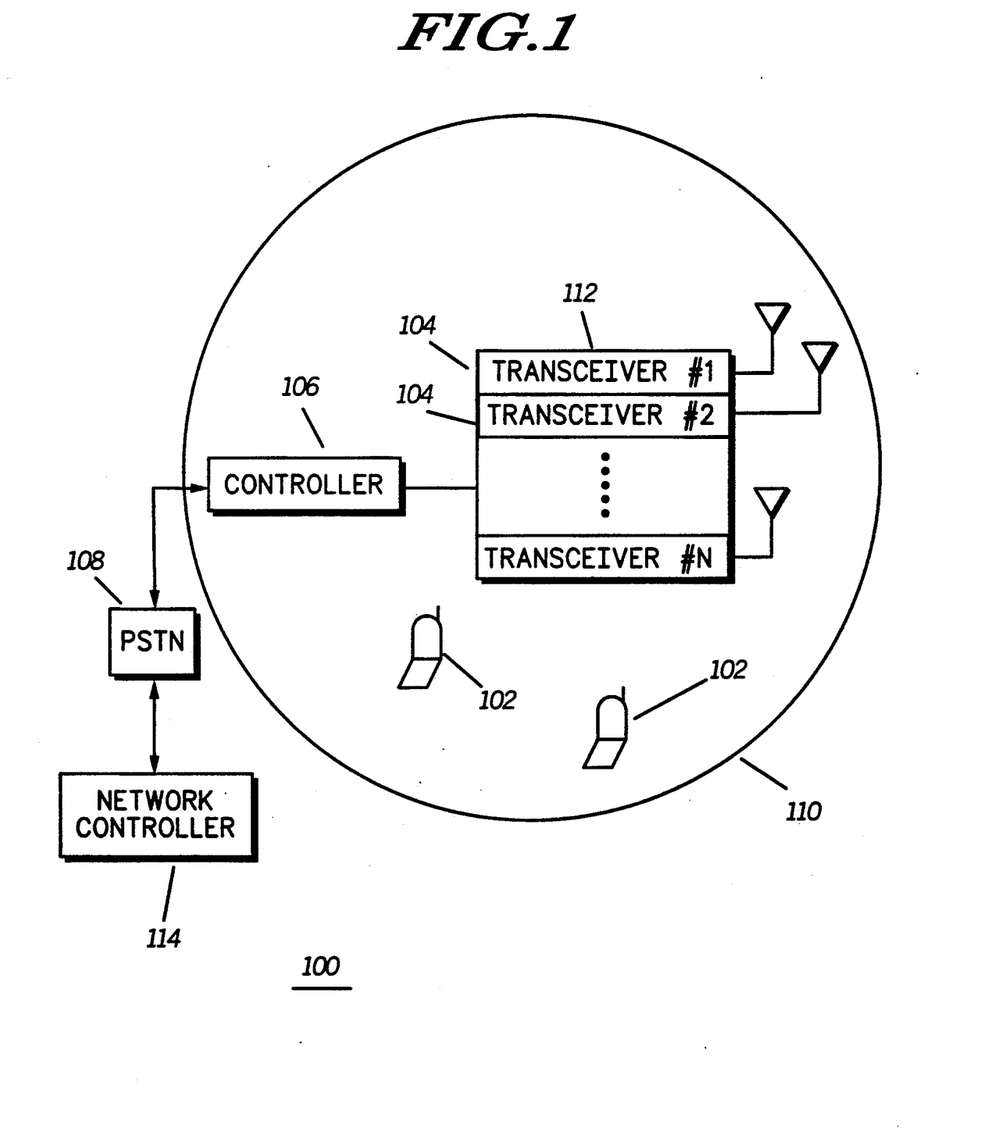
FIG. 1 shows a diagram of a CT-2 system in accordance with the invention.

Referring now to the drawings and specifically to FIG. 1, there is shown a communication system 100 in accordance with the invention. Communication system 100, which is preferably a second generation cordless telephone system or CT-2 system, comprises at least one base site 112 (fixed communication device) comprising a plurality of transceivers 104 and controller 106, and at least one portable communication device or handset 102. The base station 112 or telepoint as it is known, is in turn coupled to the public switched telephone network 108.

Telepoint 112 has a coverage area depicted by area 110. As long as a handset 102 is in coverage area 110, it can try to access one of the system's 100 communication channels in order for the handset 102 to establish a communication link with telepoint 112 in order for the handset 102 be able to make a standard telephone call. Telepoint 112 can support up to 40 radio frequency (RF) communication channels by having one transceiver 104 per channel. For example, if telepoint 112 comprises 12 transceivers 104, 12 handsets can simultaneously communicate with the PSTN 108 via the telepoint 112.

Telepoint 112, is coupled to the Public switched telephone network (PSTN) 108 via telephone lines or via any suitable wireless or wireline communication channel (e.g., microwave links, etc.). Connected to the PSTN 108 is network control station 114, which is capable of communicating with telepoint 112 (typically each CT-2 system will include multiple telepoints 112) each covering different geographic locations. Communications between network controller 114 and the individual telepoints 112 can be accomplished by direct dialling over the PSTN 108. Network controller 114 is capable of interrogating telepoint 112 in order to gather billing information (which handsets have been using the telepoint and for how long), performing maintenance checks, etc.

As discussed previously, each CT-2 telepoint 112 can operate on a plurality of radio frequency (RF) communication channels (typically from 1–40) for use by portable handsets 102. Upon requesting access to telepoint 112, handset 102 scans all of the RF channels (frequency of transceivers 104) in order to get an available channel. At which point, handset 102 transmits a request which telepoint 112 can grant. This is followed by a handshake between the two units (telepoint 112 and portable unit 102) and a portable unit 102 identification check in order to establish the identification of the portable unit 102 (used for determining if user can use system 100 and for billing purposes).

Telepoint 112 is also capable of choosing a channel and originating a call to an individual handset 102, although this is presently not used in commercial CT-2 systems. For a more detailed discussion of CT-2 systems one is referred to a publication entitled, "Common air interface specification to be used for the interworking between cordless telephone apparatus in the frequency band 864.1 MHz to 868.1 MHz, including public access services", Version 1.1, dated 30 th Jun. 1991, which is published by the European Telecommunications Standards Institute and is hereby incorporated by reference.

Figure 2:
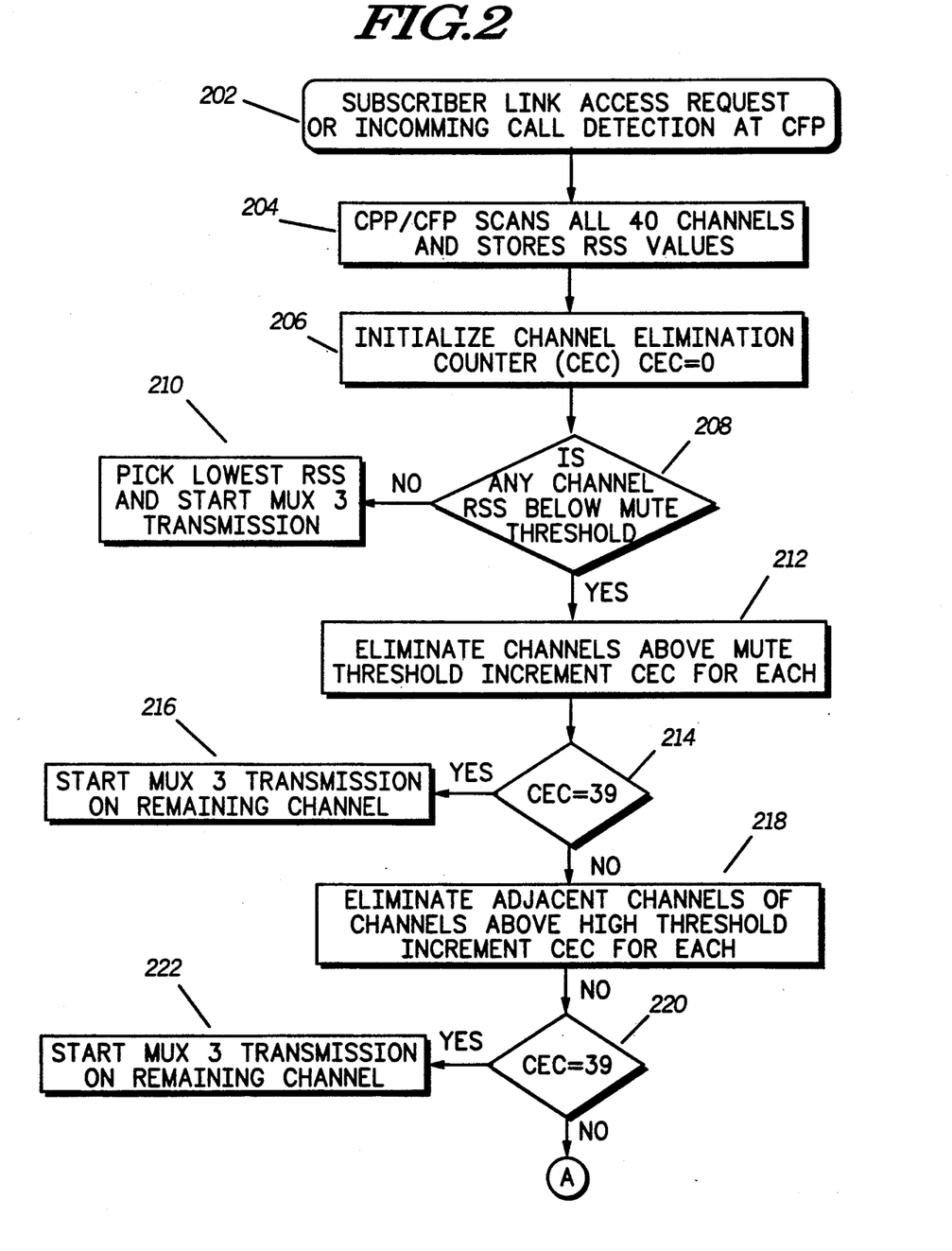
FIGS. 2–4 is a flowchart showing the steps involved in achieving optimum channel assignment in accordance with the present invention.
Figure 3:
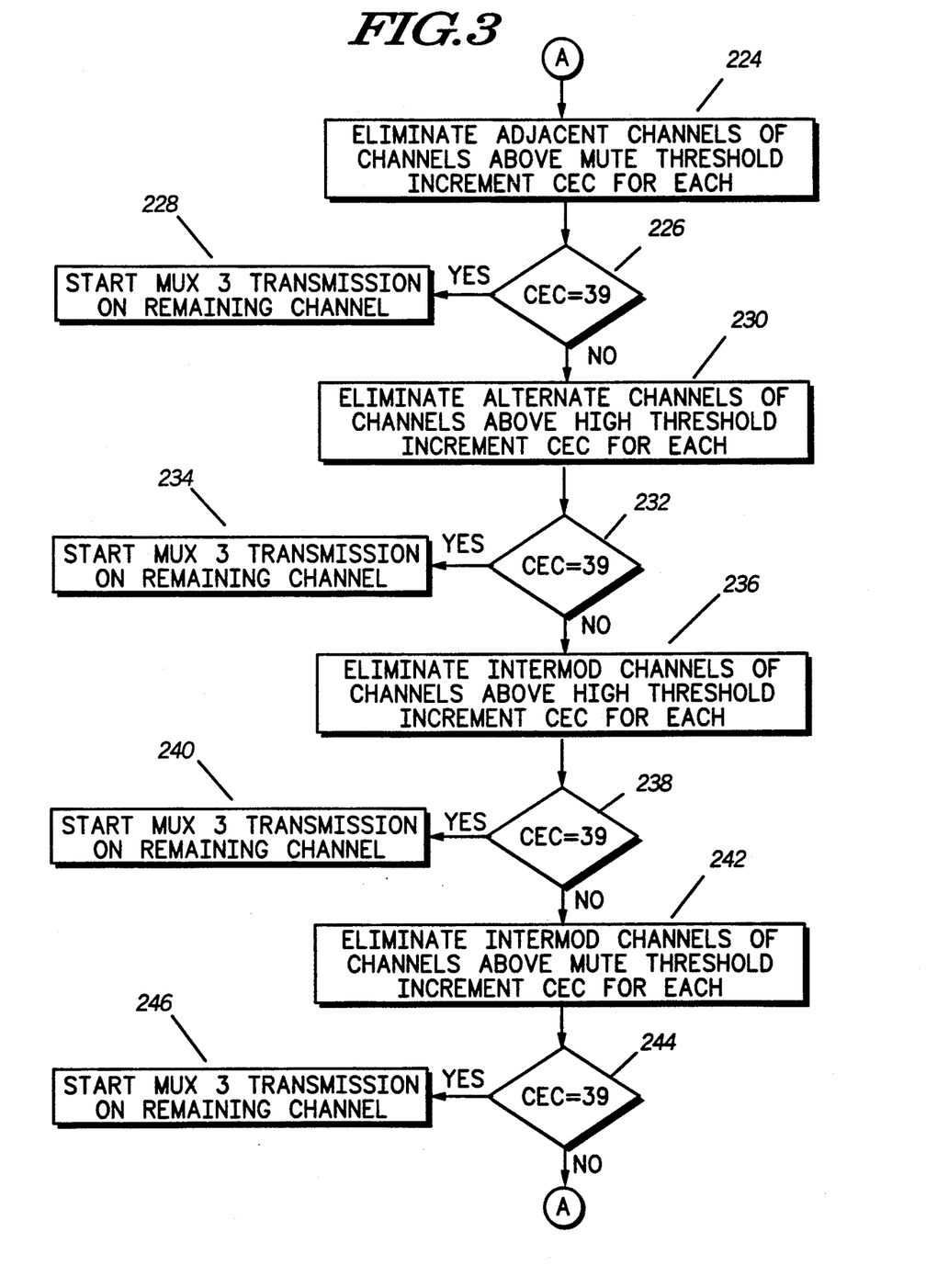
Figure 4:
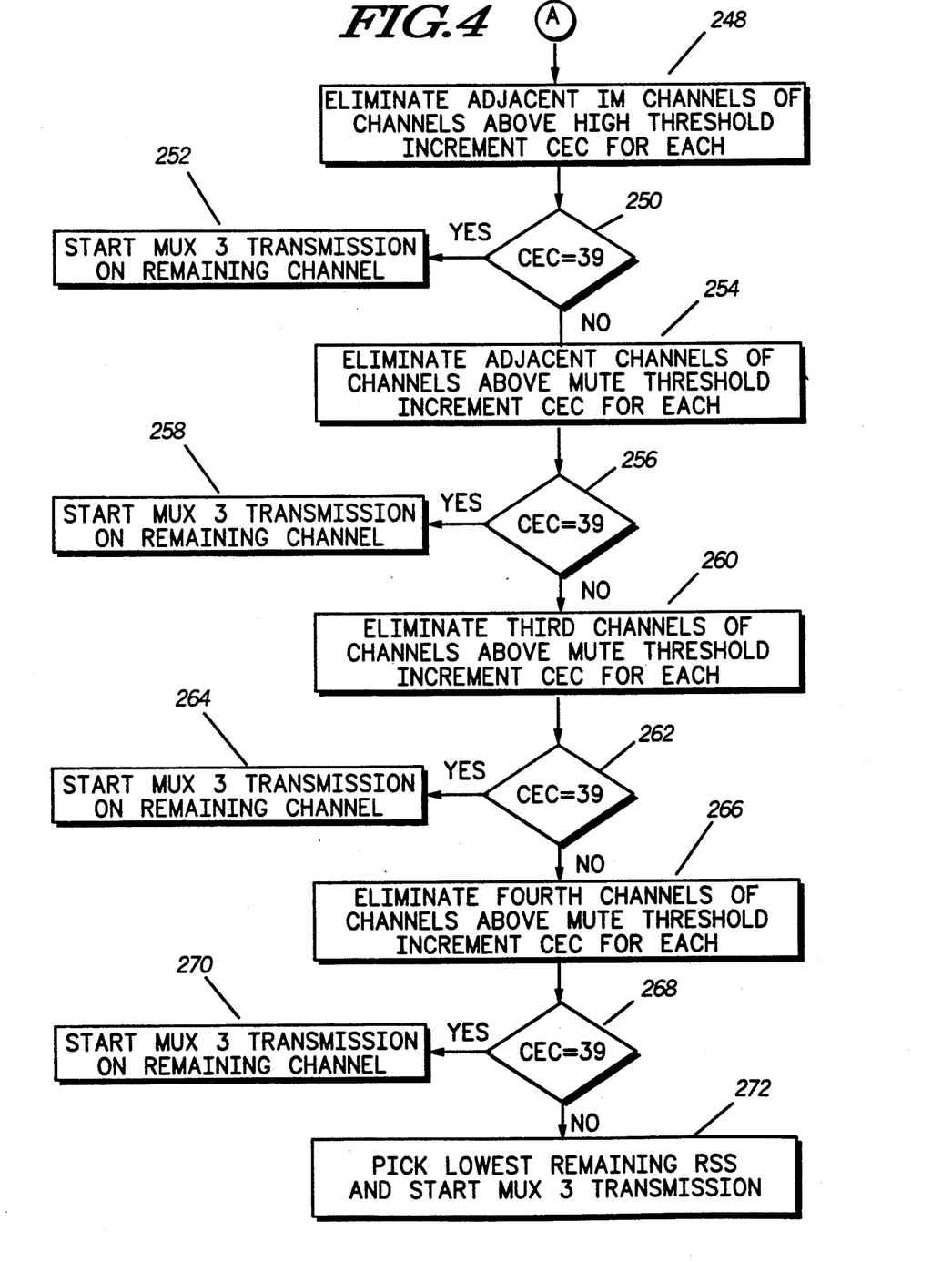

FIGS. 2-4, a flowchart showing the steps involved in obtaining the optimum communication channel among the plurality of communication channels available for use by handset 102 in accordance with the invention is shown. A similar sequence would occur if telepoint 112 wanted to originate a call to a particular handset 102. In step 202, a handset request or incoming call is detected at the cordless fixed part (CFP) which is the designation for telepoint 112 in CT-2 terms. In step 204, the cordless portable part (CPP) which is the designation for handsets 102 or the telepoint (CFP) 112 depending on which is originating the call, scans all channels (here we are assuming this telepoint system has 40 channels). Next, the receive signal strength (RSS) level measurement for each of the channels is determined and stored either in the handset 102 or telepoint 112 (the one originating the call).

Preferably, the handset or telepoint will scan all 40 channels five times taking RSS measurements for each of the channels and picking the maximum RSS level from among the five samples for each of the channels. It takes in the order of approximately 100 milliseconds to scan all 40 channels so that in less than 1 second the handset or telepoint can have the maximum RSS reading for all 40 channels. A channel elimination counter (CEC) which is part of handset 102, or telepoint 112, is then initialized to zero in step 206. The CEC keeps track of all of the channels which are taken out of consideration as the channel to use for establishing the communications link. As communication channels are eliminated from consideration, the CEC is incremented. The general concept behind the present invention is to eliminate communication channels in a hierarchical manner, based on certain criteria, so that the selected channel will create minimum interference to current system loading (i.e., other channels already occupied).

In step 208, it is determined if any channel's RSS level is below a first or mute threshold level which is also prestored at either the handset 102 or telepoint 112. If all of the communication channels have RSS levels above the mute threshold in step 210, preferably the channel with the lowest RSS level is chosen, and a so called link initiation transmission (in MUX 3 for handset 102 or MUX 2 for telepoint 112) is begun between telepoint 112 and handset 102. MUX 2 and 3 are two main communication protocols called multiplex's and are used to communicate between the portable handsets 112 and base station 112. MUX 3 is utilized mainly for communication link initiation (link establishment and reestablishment) between the handset 102 and telepoint 112. The MUX 2 protocol is used primarily for communication link establishment and for link initiation from the base 112. If some of the communication channels exhibit RSS levels lower than the mute threshold in step 212, all channels having an RSS level above the mute threshold are eliminated from consideration.

The CEC incremented as channels are eliminated one by one from consideration as the channel of choice for establishing the communication link on. In step 214, it is determined if the CEC has reached 39 which signifies that only one communication channel is left. If the CEC equals 39, then a communication link is established in step 216 with the last remaining channel. If the CEC does not equal 39 in step 218, adjacent channels of channels above a second or high threshold level are eliminated from consideration and the CEC is incremented per channel eliminated. This High or second threshold level is also stored in either handset 102 or telepoint 112. The reason for this step is not to assign adjacent channels to channels exhibiting very high RSS levels which in practice tend to interfere with the adjacent channels when other channels are still available.

In step 220, if the CEC has reached 39, the communication is established with the remaining channel in step 222. If the CEC does not equal 39, in step 224, adjacent channels of channels above the first or mute threshold level are eliminated, again the CEC is incremented for all channels eliminated. If the CEC equals 39 in step 226, the communication link is established with the last remaining channel in step 228.

If more channels are still available for establishing the communication link in step 230, alternate channels of channels above the second or high threshold level are also eliminated from consideration. If in step 232, one channel is left (CEC=39), then in step 234, communications is established using the last available channel. If more channels are still available (CEC not equal to 39), then in step 236, intermodulation channels of channels above the second or high threshold are eliminated. The process of how to determine which channels are intermodulation channels, etc. will be discussed later in this description. In step 238, it is once again determined if only one channel remains, with the communications being established with that channel in step 240, or continuing on to step 242.

In step 242, intermodulation channels above the first or mute threshold are eliminated. If no more channels are available in step 246, communication is established with the last remaining channel. If more than one channel remains in step 248, adjacent intermodulation channels of channels above the second or high threshold are eliminated. Once again, the same determination if only one channel remains is performed in steps 250 and 252, if more channels than one remain in step 254, alternate channels of channels above the first or mute threshold are eliminated.

Again, steps 256 and 258, establish communication with the last remaining channel if the CEC=39. In step 260, third channels of channels above the mute threshold level are eliminated, with the CEC being incremented per channel eliminated. Steps 262 and 264 perform the CEC check and channel establishment if the CEC equals 39. In step 266, fourth channels of channels above the mute threshold are eliminated, in steps 268 and 270 the CEC check and link establishment are performed. Finally, in step 272, if more channels still remain, the channels with the lowest RSS level (as determined by the device wanting to originate the telephone call) is chosen, and communications is established using that particular channel.

The following table 1 shows the formulas used in calculating adjacent, alternate, IM (intermodulation), third and fourth channels as discussed above.

| CHANNEL | FORMULA | NOTES |
|---|---|---|
| COCHANNEL ABOVE MUTE THRESHOLD | N | Channel N RSS above mute threshold |
| ADJACENT CHANNELS OF CHANNEL ABOVE HIGH THRESHOLD | N + 1<br>N − 1 | Channel N RSS above high threshold |
| ADJACENT CHANNELS OF CHANNEL ABOVE MUTE THRESHOLD | N + 1<br>N − 1 | Channel N RSS above mute threshold |
| ALTERNATE CHANNELS OF CHANNEL ABOVE HIGH THRESHOLD | N + 2<br>N − 2 | Channel N RSS above high threshold |
| INTERMOD CHANNELS OF CHANNELS ABOVE HIGH THRESHOLD | $2N_1 - N_2$<br>$2N_2 - N_1$<br>$(N_1 + N_2)/2$ (For Integer results) | Channels $N_1$, $N_2$ RSS above high threshold |
| INTERMOD CHANNELS OF CHANNELS ABOVE MUTE THRESHOLD | $2N_1 - N_2$<br>$2N_2 - N_1$<br>$(N_1 + N_2)/2$ (For Integer results) | Channels $N_1$, $N_2$ RSS above mute threshold |
| ADJACENT IM CHANNELS OF CHANNELS ABOVE HIGH THRESHOLD | $(2N_1 - N_2) +/- 1$<br>$(2N_2 - N_1) +/- 1$<br>$((N_1 + N_2)/2) +/- 1$<br>(For Integer results) | Channels $N_1$, $N_2$ RSS above high threshold |
| ALTERNATE CHANNELS OF CHANNEL MUTE THRESHOLD | N + 2<br>N − 2 | Channel N RSS above mute threshold |
| THIRD CHANNELS OF CHANNEL ABOVE MUTE THRESHOLD | N + 3<br>N − 3 | Channel N RSS above mute threshold |
| FOURTH CHANNELS OF CHANNEL ABOVE MUTE THRESHOLD | N + 4<br>N − 4 | Channel N RSS above mute threshold |
| CHANNEL WITH HIGHER RSSI | N | |

For example as shown in Table 1, the alternate channel for channel number 5 would be channels 7 and 3 (5+2 and 5−2). Intermodulation channels are determined by taking the first channel ($N_1$) above a certain threshold (mute or high threshold) multiplying it by two and subtracting the channel number of the next channel ($N_2$) above that specified threshold. This is followed by taking the second channel above the threshold, multiplying the channel number by two and subtracting the first channel number above the particular threshold. This process is continued until all combinations of channels above the threshold are done. Also, the sum of the two channel numbers above a given threshold are added and divided by two and if an integer results, that channel is also eliminated as an intermodulation channel. In case where the resulting number is negative or greater than 40, the channel numbers that are determined are ignored since these resultant channels do not fall within the CT-2 frequency band.

Figure 5:
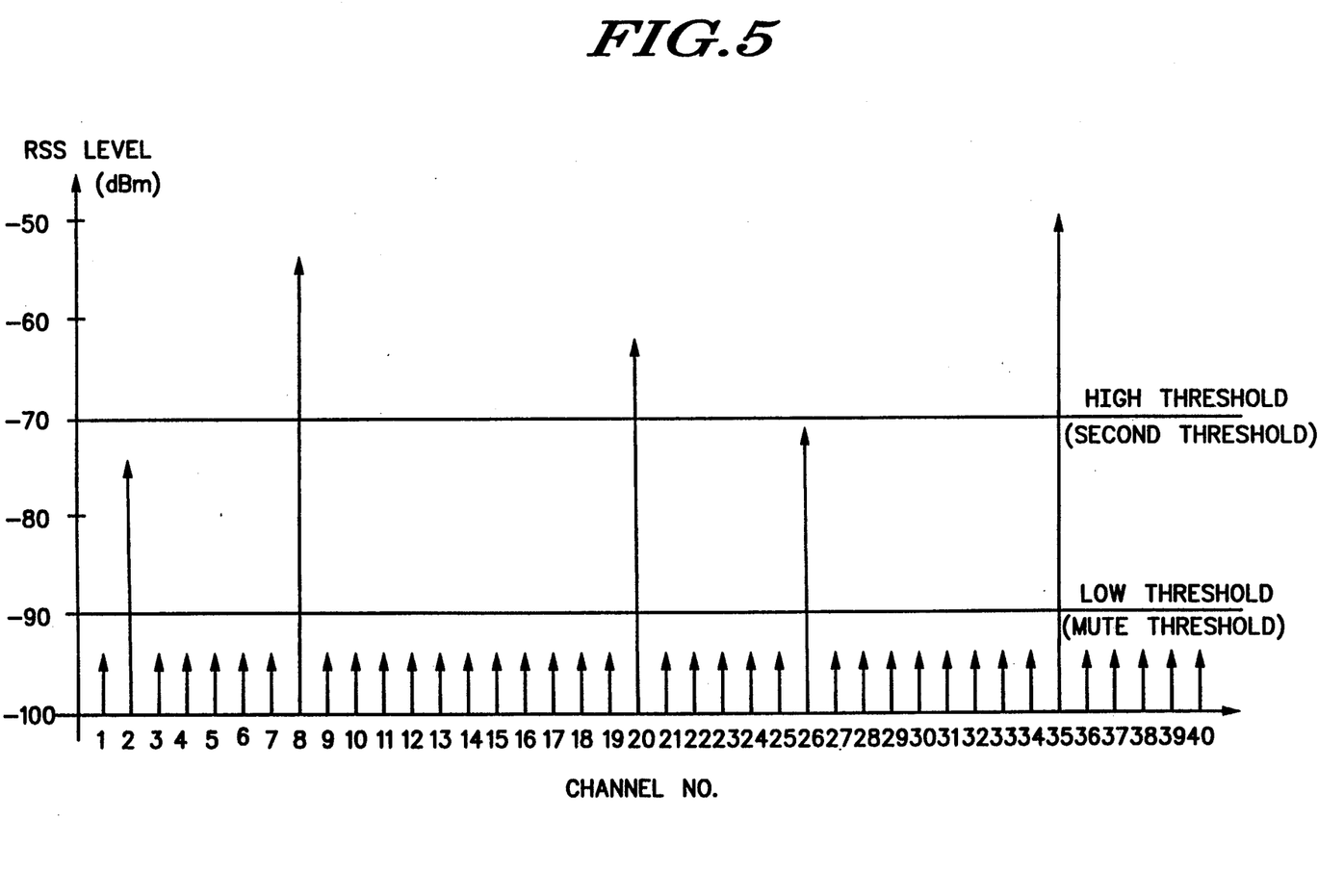
FIG. 5 shows a RSS level representation example for the communication channels in a CT-2 system in accordance with the present invention.

In FIG. 5, a typical RSS level representation as seen by handset 102 (although a similar representation can apply to telepoint 112) is shown after all channels have been scanned and their RSS levels stored. FIG. 5, shows the first threshold (mute or low threshold) being set at −90 dBm, while the second or high threshold is set at −70 dBm. These two threshold levels can be modified on a per system basis, depending on the unique system characteristics. For example, the knowledge that two CT-2 systems in a congested area overlap causing a greater chance for interference may cause the two threshold levels to be set lower. The two threshold levels are stored in memory at the handset 102 and/or telepoint 112 as required.

As shown, channels 8, 20 and 35 have RSS levels above the high (second) threshold, while channels 2, 8, 20, 26 and 35 have levels above the mute threshold. By following the steps described in FIGS. 2–4, we can see how the optimum channel in this particular RSS scenario is determined. First, as described in step 212, channels having an RSS level above the mute threshold level (co-channels) are eliminated from consideration (channels 2, 8, 20, 26 and 35) as channels to be used to establish the communication link between the handset and telepoint. Every time a channel is eliminated from consideration the channel elimination counter (CEC) is incremented in order to know how many channels remain for consideration. Next, communication channels adjacent to channels above the high threshold (step 218 in FIG. 2) are eliminated which are channels 7, 9, 19, 21, 34 and 36. At this point, the CEC has a value of 11. Next, adjacent channels to channels above the mute threshold are eliminated from consideration (channels 1, 3, 25, and 27), with the CEC equaling 15 at this point. This is followed by elimination of alternate channels of channels above the high threshold level (channels 6, 10, 18, 22, 33 and 37, CEC equals 21). Intermodulation channels of channels above the high threshold are eliminated next, which include channels 5, 14, and 32 with the CEC reaching a value of 24.

This is followed by eliminating intermodulation channels of channels above the mute threshold (channels 2, 8, 20, 26 and 35) which using the formula of table 1 yields the elimination of channels 38, 11, 17, and 23 with the CEC having a value of 28. Adjacent intermodulation channels of channels above the high threshold are eliminated next. This step eliminates channels 4, 13, 15, 28 and 31 leaving the CEC with a value of 33.

The elimination of alternate channels of channels above mute threshold is done next, eliminating channel 24 (CEC equals 34). Third channels of channels above the mute threshold are also eliminated, which yields the elimination of channel 29. The fourth channels of channels above mute threshold criteria eliminates channels 12, 16, 30 and 39 leaving the CEC equalling 39 signifying that only one channel remains. Channel 40 which is the remaining channel, would thus be chosen as the channel to establish the communication link between the handset and telepoint, given the RSS information of FIG. 5. The channel priority given the scenario presented in FIG. 5 would dictate that channel 40 would be the highest priority channel to establish the communication link on, followed by channels 12, 16, 30 and 39 being the next channels to be picked from, etc. In the case more than one communication channel remains after performing all of the above steps, in step 272 the channel among those left with the best RSS level is chosen. While in a given step before reaching step 272 more than one channel is available for use, the communication device should preferably chose the channel exhibiting the lowest RSS level in that particular step or else just choose at random from those channels remaining (this will depend on the criteria's one wants to set up for the particular system 100 in question).

Although the preferred embodiment of the present invention utilizes all of the above criteria's for establishing the optimum communication channel for system 100, those skilled in the art will appreciate that different system applications may need to utilize only a subset of all of these criteria's.

In FIG. 6 a diagram 400 showing how the optimum communication channel is chosen in accordance with the invention is shown. FIG. 6, only shows the first time a particular channel (1-40) is eliminated, it is very likely that different channel criteria (3rd channel, adjacent, etc.) will eliminate the same channel number in different steps (1-10). Since only a communication channel is eliminated it is no longer considered, only the first time a particular channel number is eliminated is shown in FIG. 6. Channel numbers 402 are shown on the top of the figure, while the application of the different channel criteria's 404 is shown on the side. Remaining channels under consideration after each of the steps are performed are shown in rows 406 at the bottom of the figure.

Figure 7:
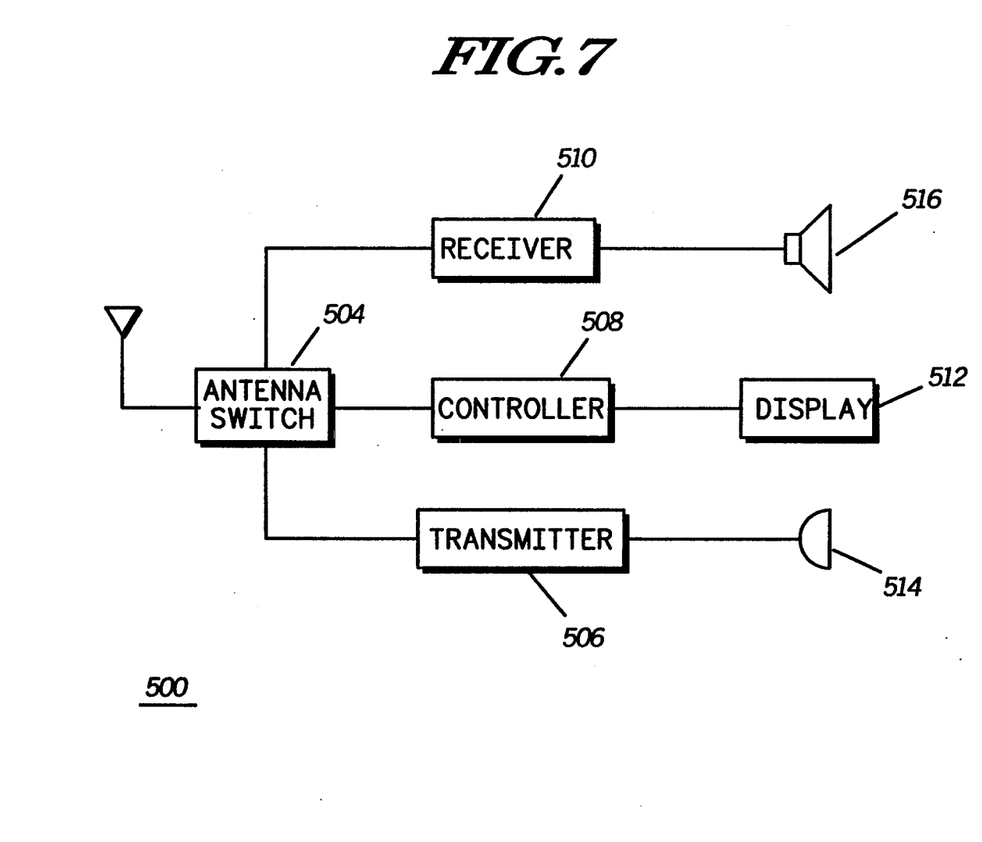
FIG. 7 shows a block diagram of a CT-2 handset in accordance with the present invention.

In FIG. 7, a block diagram of a cordless telephone device 500 (similar to handset 102 in FIG. 1) in accordance with the present invention is shown. The handset 500 includes, a controller unit 508 such as a microprocessor which controls a conventional time domain duplex receiver 510 and transmitter 506. An antenna switch or circulator 504 selectively couples the transmitter 506 and receiver 510 to antenna 502. A display 512 is also included for displaying information such as telephone number dialed, etc.

A speaker 516 is coupled to receiver 510 for the presentation of voice messages. A microphone 514 is coupled to transmitter 506 for inputting voice messages to be transmitted by handset 500. Controller 508 includes memory locations for storing the channel elimination counter (CEC) value, measured communication channel RSS levels and for storing and executing the software program which will implement the present invention. Controller 508 automatically increments the CEC every time one of the communication channels is eliminated from consideration. The controller 508 is also responsible for allowing receiver 510 to scan all of the channels in order to measure the RSS levels for each of the systems communication channels. Receivers 510 includes circuitry for measuring the receiver signal strength of the communication channels which are being received. The RSS levels of all of the system communication channels (e.g., channels 1-40) once measured by receiver 510, are stored in controller 508 for further processing in order to determine the optimum communication channel to use in accordance with the invention.

Telepoint 112 can also determine the RSS levels for all of the available communication channels (frequencies of transceivers 104) and store the resulting information in controller 106. Controller 106 is also able to execute a program which can provide for optimum channel assignment in accordance with the invention, in the situation where the telepoint 112 is originating a call to a handset 102. Telepoint controller 106 will request RSS levels from all of the transceivers 104 receiver sections and then store these values in memory. Which is basically requesting from all of the transceiver's 104 receiver sections to determine the RSS level for each of their respective channel frequencies. This is followed by the application of channel selection criteria as previously discussed, in order to determine the optimum communication channel to use.

In summary, the present invention provides for establishing a communication link between a telepoint 112 and handset 102 having the least chance for in-band interference. The present invention also helps in assigning the communication channel which will have the least chance of affecting channels already in use. Furthermore, increased system capacity in the form of each telepoint 112 being able to have more channels (closer to the 40 channel maximum) available, with less chances of interference is another benefit of the present invention.

What is claimed is:

1. A method for selecting from a communication device a communication channel from among a plurality of communication channels available in a communication system for establishing a communication link comprising the steps of:

determining the receive signal strength level for each of the plurality of communication channels at the communication device;

determining if any of the plurality of communication channels have a receive signal strength level above a first threshold level;

selecting the communication channel which has the lowest receive signal strength level if it is determined that all of the plurality of communication channels have a receive signal strength level above the first threshold level;

determining which communication channels are adjacent to communication channels above a second threshold level when a communication channel was not previously selected; and     selecting a communication channel which is not adjacent to communication channels above the second threshold level.

2. A method for selecting from a communication device a communication channel from among a plurality of communication channels available in a communication system for establishing a communication link comprising the steps of:

determining the receive signal strength level for each of the plurality of communication channels at the communication device;

determining if any of the plurality of communication channels have a receive signal strength level above a first threshold level;

selecting the communication channel which has the lowest receive signal strength level if it is determined that all of the plurality of communication channels have a receive signal strength level above the first threshold level;

determining which communication channels are adjacent to communication channels above the first threshold level and which communication channels are alternate communication channels of communication channels above a second threshold level when a communication channel was not previously selected; and selecting a communication channel which is not adjacent to communication channels above the first threshold level and which is not alternate of communication channels above the second threshold.

3. A method for selecting from a communication device a communication channel from among a plurality of communication channels available in a communication system for establishing a communication link comprising the steps of:

determining the receive signal strength level for each of the plurality of communication channels at the communication device;

determining if any of the plurality of communication channels have a receive signal strength level above a first threshold level;

selecting the communication channel which has the lowest receive signal strength level if it is determined that all of the plurality of communication channels have a receive signal strength level above the first threshold level;

determining which communication channels are adjacent to communication channels above the first threshold level, which communication channels are alternate and intermodulation communication channels of communication channels above a second threshold level when a communication channel was not previously selected; and selecting a communication channel which is not adjacent to communication channels above the first threshold level and which is not an alternate or intermodulation channel of communication channels above the second threshold.

4. A method for selecting an optimum communication channel in a communication system having a plurality of communication channels, comprising the steps of:

determining the receive signal strength level for each of the plurality of communication channels at a communication device;

eliminating from consideration communication channels from among the plurality of communication channels in the communication system by applying two channel selection criteria selected from the group consisting of:

eliminating from consideration communication channels having a receive signal strength level above a first threshold level, eliminating from consideration communication channels adjacent to communication channels having a receive signal strength level above a second threshold level, eliminating from consideration alternate channels of communication channels above the second threshold level, and eliminating from consideration intermodulation channels of communication channels above the first threshold level; and selecting from the remaining communication channels a communication channel.

5. The method of claim 4, wherein the step of determining the receive signal strength level for each of the plurality of communication channels at the communication device comprises the steps of:

scanning at least two times through the plurality of communication channels in order to measure the receive signal strength level for each of the plurality of communication channels for each of the at least two times the plurality of communication channels are scanned; and selecting the receive signal strength level which is greatest for each of the plurality of communication channels from among the at least two times the receive signal strength levels were measured for each of the plurality of communication channels.

6. The method of claim 5, wherein the step of selecting from the remaining communication channels, further comprises the step of:

selecting as the communication channel to the communication channel having the lowest receive signal strength level from among those communication channels that remain.

7. A radio frequency communication device for selecting an optimum communication channel from among a plurality of communication channels, comprising:

means for determining the receive signal strength level of each of the plurality of communication channels; and a controller means responsive to the means for determining the receive signal strength levels for each of the plurality of communication channels for comparing each of the receive signal strength levels to first and second threshold levels and selecting a communication channel whose receive signal strength level is not above the first threshold or adjacent to a communication channel having a receive signal strength level above the second threshold.

8. The communication device of claim 7, wherein the means for determining the receive signal strength level of each of the plurality of communication channels comprises a receiver.

* * * * *